United States Patent
Momoki

(10) Patent No.: US 7,369,186 B2
(45) Date of Patent: May 6, 2008

(54) POLARIZING BEAM SPLITTER FEATURING STACKED GRATING LAYERS AND DISPLAY INCLUDING THE SAME

(75) Inventor: Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/265,422

(22) Filed: Nov. 1, 2005

(65) Prior Publication Data

US 2006/0092513 A1 May 4, 2006

(30) Foreign Application Priority Data

Nov. 4, 2004 (JP) ............................. 2004-320989

(51) Int. Cl.
*G02F 1/1335* (2006.01)
*G02B 5/30* (2006.01)

(52) U.S. Cl. ..................... 349/9; 349/96; 359/494; 359/495; 359/496

(58) Field of Classification Search .................. 349/9, 349/96; 359/483, 486, 497, 566, 569, 576, 359/494–496
See application file for complete search history.

(56) References Cited

U.S. PATENT DOCUMENTS 6,764,182 B2 * 7/2004 Ito et al. ..................... 353/20
6,947,215 B2 * 9/2005 Hoshi .......................... 359/576
7,009,768 B2 * 3/2006 Sakamoto .................... 359/486
7,116,478 B2 * 10/2006 Momoki et al. ............. 359/486
2002/0164105 A1 * 11/2002 Simpson et al. .............. 385/11
2003/0081317 A1 * 5/2003 Katsumata et al. .......... 359/566
2003/0112510 A1 * 6/2003 Florence ...................... 359/486
2005/0063060 A1 3/2005 Katsumata

FOREIGN PATENT DOCUMENTS

JP 11-95027 A 4/1999
JP 2003-195223 A 7/2003

OTHER PUBLICATIONS

Lopez et al. "Wave-plate polarizing beam splitter based on a form-birefringent multilayer grating." Optics Letters, vol. 23, No. 20, pp. 1627-1629.*
Tyan et al. "Polarizing beam splitter based on the anisotropic spectral reflectivity characteristic of form-birefringent multilayer gratings." Optics Letters, vol. 21, No. 10.*
Gao et al. "Single camera stere using planar parallel plate." Available at http://vision.ai.uiuc.edu/newpubs/Stereo_PPP_Gao.pdf.*

* cited by examiner

*Primary Examiner*—Andrew Schechter
*Assistant Examiner*—Matthew Tynan
(74) *Attorney, Agent, or Firm*—Canon U.S.A. Inc., IP Division

(57) ABSTRACT

A polarizing beam splitter includes a polarization splitting layer which includes stacked one-dimensional grating layers. The grating layers can include alternating layers of at least one H layer having an effective refractive index $n_H$ for p-polarized light and at least one L layer having an effective refractive index $n_L$ for p-polarized light.

13 Claims, 8 Drawing Sheets

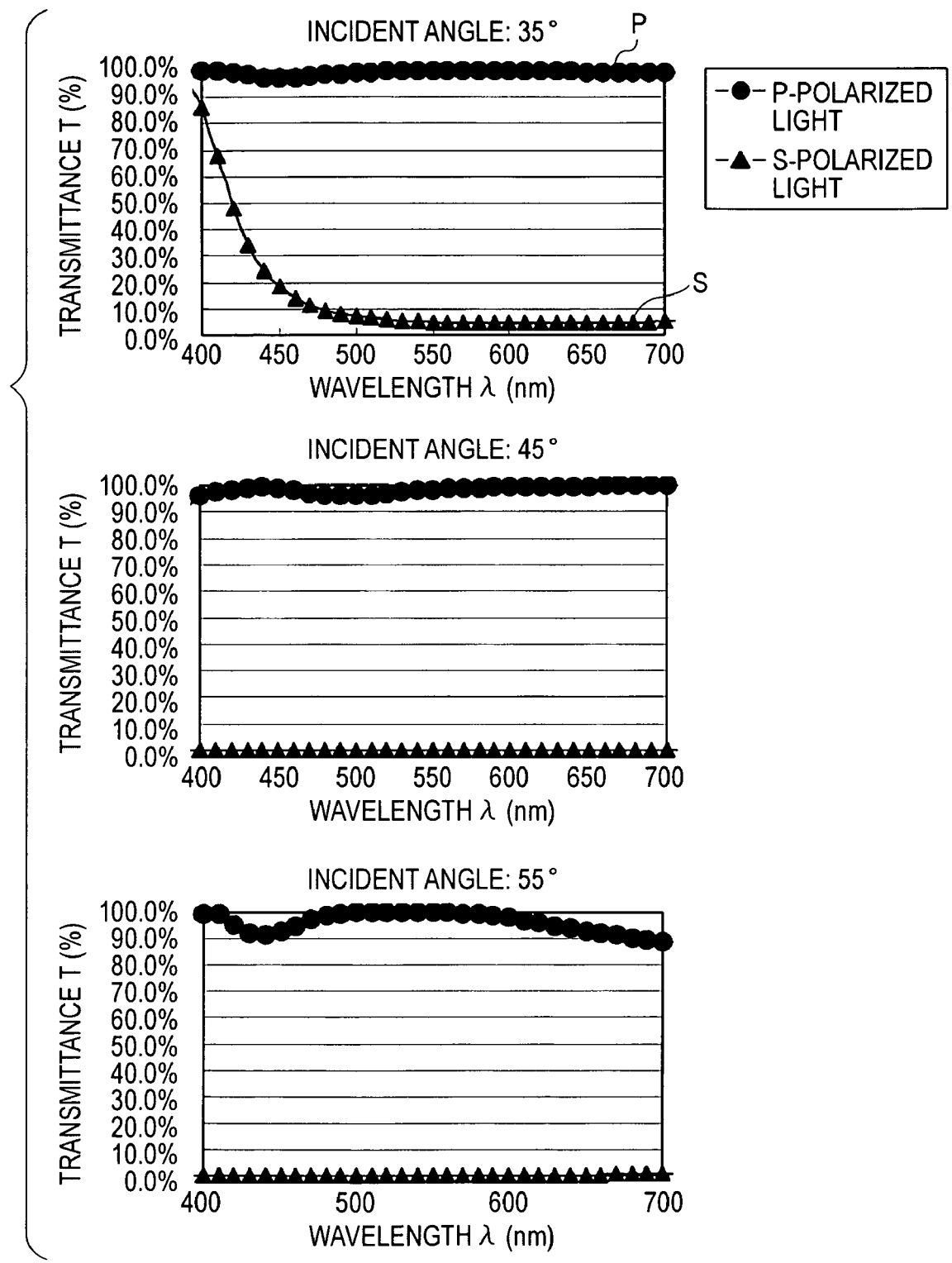

POLARIZING BEAM SPLITTER FEATURING STACKED GRATING LAYERS AND DISPLAY INCLUDING THE SAME

BACKGROUND OF THE INVENTION

1. Field of the Invention

The present invention relates to polarizing beam splitters and displays including the polarizing beam splitters.

2. Description of the Related Art

Among known polarizing beam splitters is a wire-grid polarizing beam splitter, which includes a metal diffraction grid.

This polarizing beam splitter includes conductors, for example metal conductors, arranged in parallel in a grid pattern. This structure has the effect of eliminating polarized light oscillating in a direction parallel to the grating and transmitting only polarized light oscillating in a direction substantially perpendicular to the grating. This polarizing beam splitter is intended for electromagnetic waves and infrared light, and has also been used for visible light.

Because the wire grid has a sub-wavelength pitch, the polarizing beam splitter is produced by a semiconductor process (e.g., photolithography). Accordingly, the wire grid is often formed on a plane-parallel plate. In addition, the wire grid is often disposed between plane-parallel plates to reduce the oxidation corrosion of the metal grid.

For use in an optical system, the polarization surface of the polarizing beam splitter is tilted with respect to the optical path. As a result, the plane-parallel plates become inclined in the optical path, thus causing astigmatism in the optical system.

Japanese Patent Laid-Open No. 2003-195223 (corresponding to US AA2003081317) discusses a polarizing beam splitter including a diffraction grid disposed between plane-parallel plates, as a pair of diffraction grid substrates. The plane-parallel plates are disposed between prism-shaped block substrates having substantially the same refractive index. To reduce astigmatism, the block substrates and the diffraction grid substrates are bonded with a flexible adhesive or a medium having substantially the same refractive index as the block substrates and the diffraction grid substrates.

On the other hand, the wire-grid polarizing beam splitter has difficulty in achieving sufficient optical performance because both reflected light and transmitted light undergo absorption.

Accordingly, for example, a polarizing beam splitter including stacked dielectric layers having a sub-wavelength structure (SWS) is conventionally used.

This polarizing beam splitter includes, for example, stacked one-dimensional dielectric gratings having the SWS to exploit the increased birefringence of the one-dimensional gratings. The dielectric gratings are arranged so that a chosen refractive index can be achieved in each polarization direction to provide increased polarization splitting performance over wide ranges of angles and wavelengths.

Japanese Patent Laid-Open No. 11-95027 discusses an SWS polarizing beam splitter including a stack of layers with a grating pitch smaller than the wavelength used and gap layers or dielectric layers.

These layers have a thickness of ¼ the wavelength of either of two substantially orthogonal polarized light components so that the polarizing beam splitter can selectively reflect one of the polarized light components.

Although the incident angle is substantially perpendicular to the polarizing beam splitter, it achieves increased polarization splitting performance.

In particular, the polarizing beam splitter, including the stacked dielectric layers having the SWS, uses the transmission of p-polarized light at Brewster's angle. Its performance therefore depends largely on changes in the effective refractive indices of the dielectric layers and the refractive indices of the media adjacent to the layers. In addition, the stacked dielectric layers having the SWS can be formed on a plane-parallel plate, as in the case of the wire-grid polarizing beam splitter, since the fine structure is produced by a semiconductor process (e.g., photolithography). Furthermore, materials that can be used in the production process can fail to provide sufficient polarization splitting performance.

SUMMARY OF THE INVENTION

At least one exemplary embodiment is directed to a polarizing beam splitter having improved polarization splitting performance by adjusting the effective refractive index of a polarization splitting layer and the refractive index of a plane-parallel plate on which the polarization splitting layer is provided.

A polarizing beam splitter according to at least one exemplary embodiment includes a plane-parallel plate; a polarization splitting layer formed on the plane-parallel plate to split incident light into reflected light and transmitted light according to the polarization directions thereof; and a first optical member including a light entrance surface, a light exit surface that transmits the light reflected by the polarization splitting layer, and a surface in contact with the plane-parallel plate. The polarization splitting layer includes stacked one-dimensional grating layers. The stacked grating layers can be an alternation of at least one H layer including an effective refractive index $n_H$ for p-polarized light and at least one L layer including an effective refractive index $n_L$ for p-polarized light. The polarizing beam splitter can satisfy the following equation:

$$0.7 < \sqrt{\frac{n_H^2 n_L^2}{\sin^2\theta_1 (n_H^2 + n_L^2)}} \bigg/ n_P < 1.3$$

where $n_P$ is the refractive index of the material for the plane-parallel plate; and $\theta_1$ is the angle between the light entrance surface of the first optical member and the polarization splitting layer.

Further features of the present invention will become apparent from the following description of exemplary embodiments with reference to the attached drawings.

BRIEF DESCRIPTION OF THE DRAWINGS

FIG. 13 illustrates graphs showing the polarization splitting characteristics of the polarizing beam splitter according to the first exemplary embodiment in the visible light region according to RCWA calculations.

DESCRIPTION OF THE EMBODIMENTS

Figure 1:
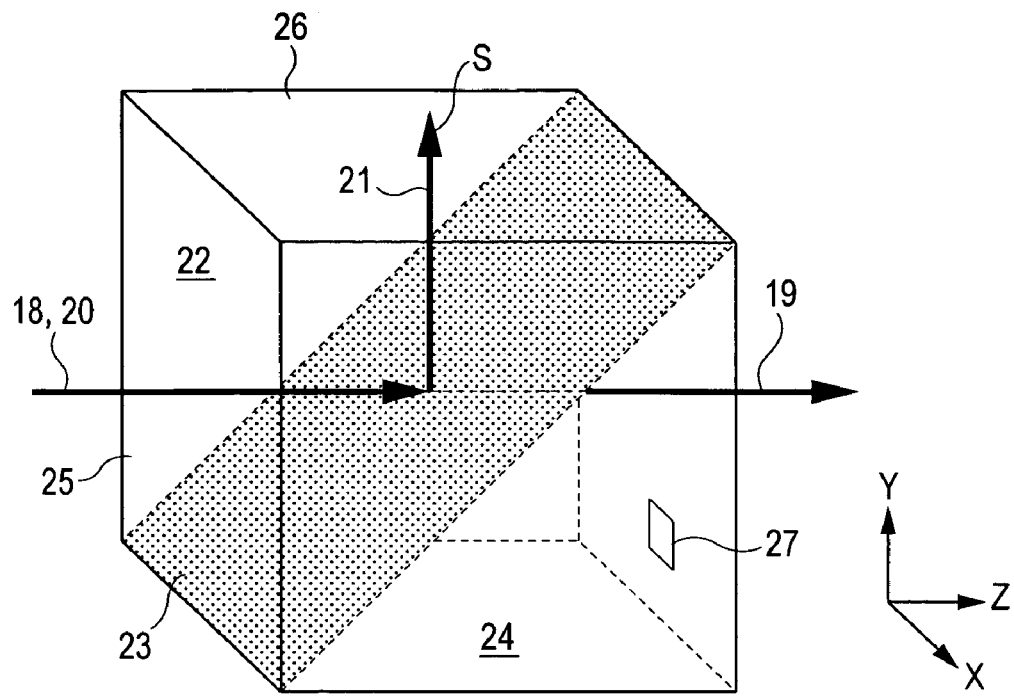
FIG. 1 illustrates a schematic diagram of a polarizing beam splitter according to a first exemplary embodiment.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example a light source is mentioned and an example of a high-pressure mercury vapor lamp can be used, however any light source that provides the illumination needed for the working of embodiments is intended to lie within the scope of exemplary embodiments.

Additionally the actual size of optical elements may not be discussed however any size from macro to nano sized optical elements are intended to lie within the scope of exemplary embodiments (e.g., waveplates with dimensions of nanometer size, micro size, centimeter size, and meter sizes). Additionally, exemplary embodiments are not limited to visual optical photographic systems, for example the system can be designed for use with infrared and other wavelength imaging systems. Additionally, exemplary embodiments can be used with non-digital systems as well as digital systems (e.g., photographic systems using CCDs)

Note that similar reference numerals and letters refer to similar items in the following figures, and thus once an item is defined in one figure, it may not be discussed for following figures.

FIG. 1 is a schematic diagram illustrating the optical properties of a polarizing beam splitter according to a first exemplary embodiment.

Figure 2:
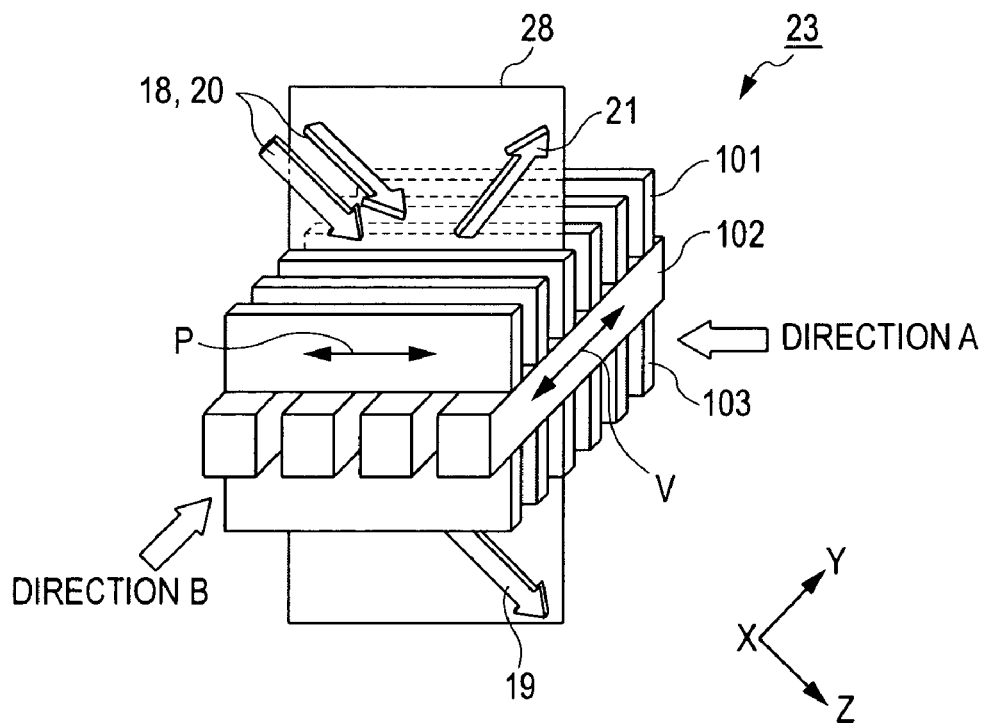
FIG. 2 is a perspective view illustrating the shapes of gratings in the polarizing beam splitter according to the first exemplary embodiment.
Figure 3:
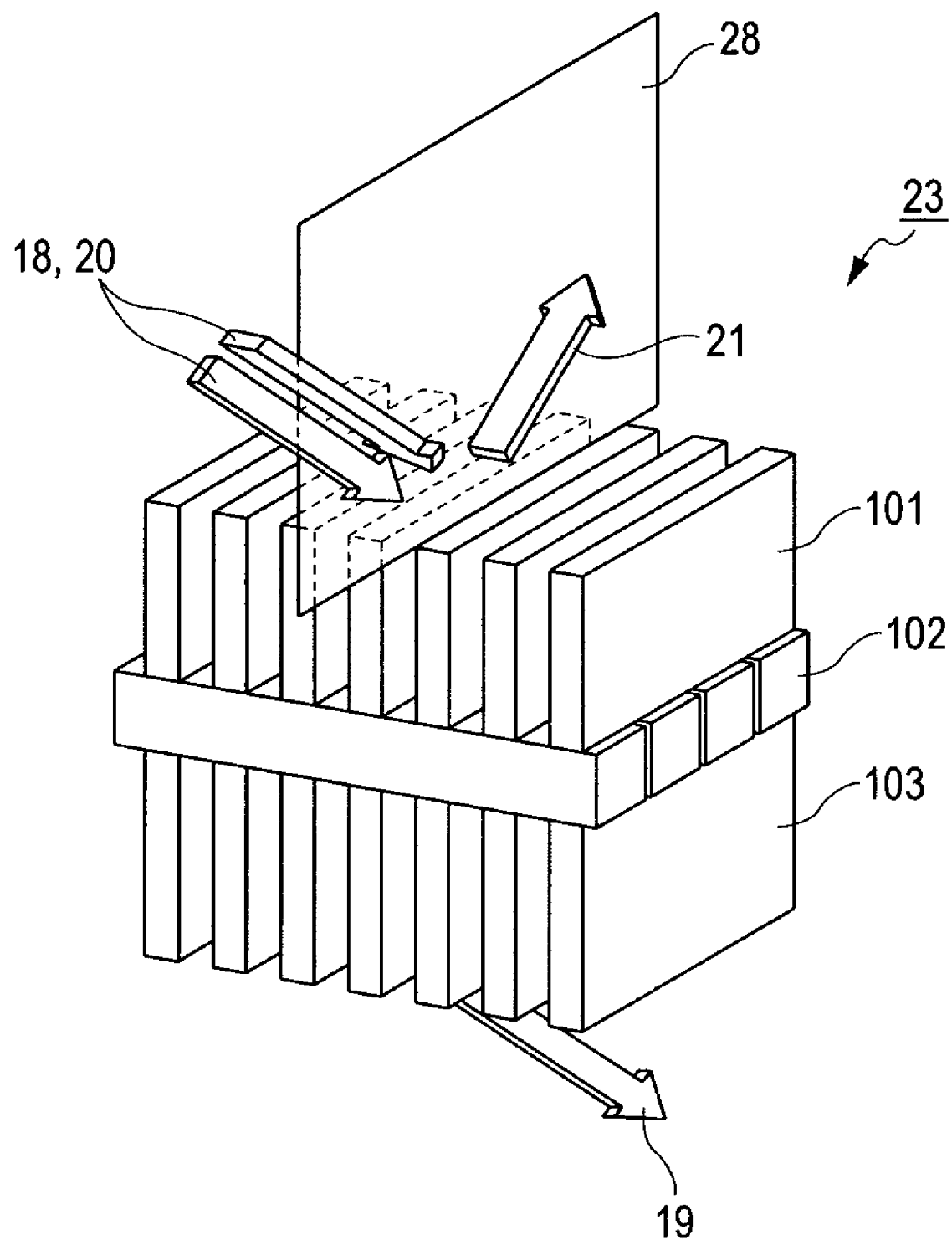
FIG. 3 is another perspective view illustrating the shapes of the gratings in the polarizing beam splitter according to the first exemplary embodiment.

FIGS. 2 and 3 are perspective views of the main part of a polarization splitting layer in the polarizing beam splitter according to the first exemplary embodiment.

Figure 6:
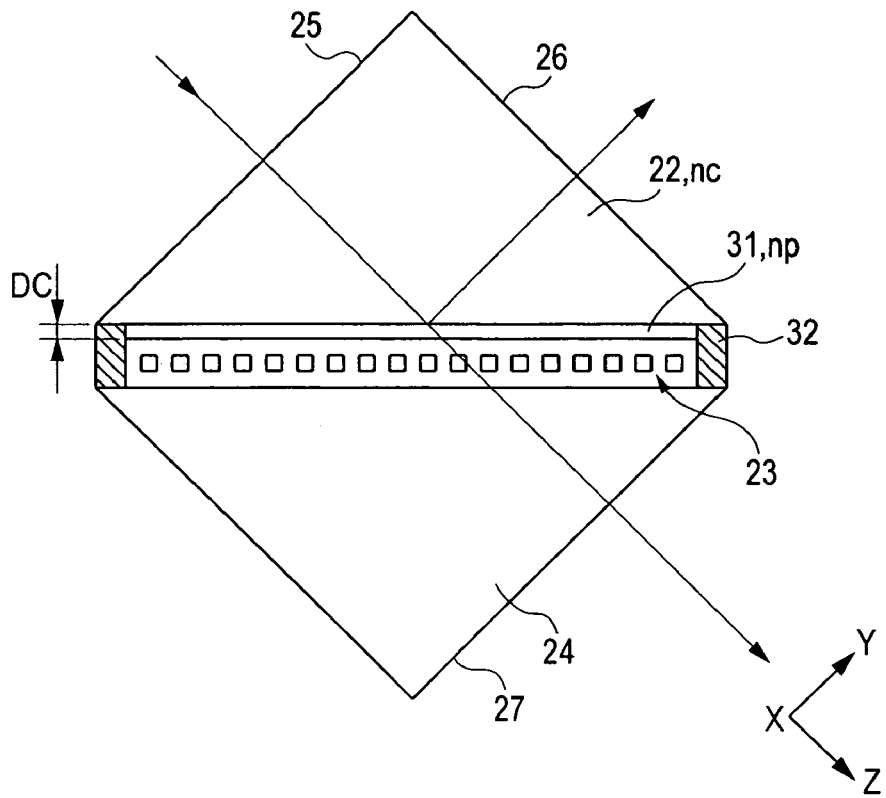
FIG. 6 illustrates another schematic diagram of the polarizing beam splitter according to the first exemplary embodiment.

FIG. 6 is a sectional view of the polarizing beam splitter according to the first exemplary embodiment. Table 1 shows the properties of the polarization splitting layer in the first exemplary embodiment.

Figure 4:
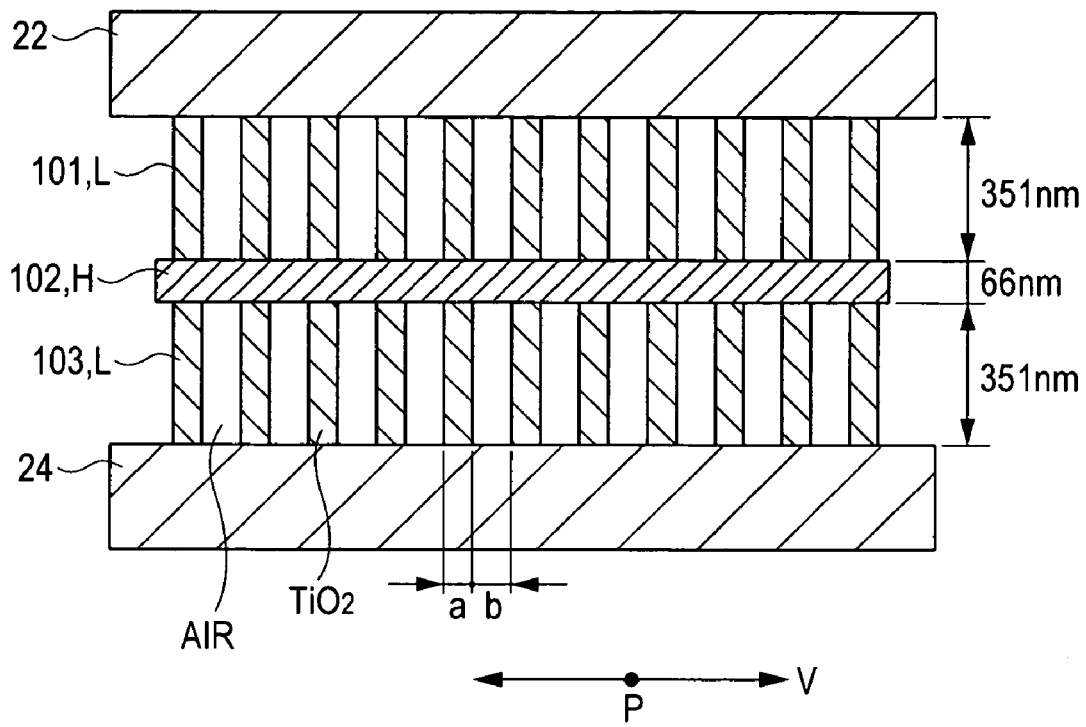
FIG. 4 illustrates a sectional view of the gratings in the polarizing beam splitter according to the first exemplary embodiment from the direction A in FIG. 2.

Referring to FIGS. 1 to 3 and 6, the polarizing beam splitter according to this exemplary embodiment includes a plane-parallel plate 31 (FIG. 6), a polarization splitting layer 23 disposed on the plane-parallel plate 31, and first and second optical members (e.g., prisms) 22 and 24 (FIGS. 1 and 6) between which the plane-parallel plate 31 and the polarization splitting layer 23 are held. In FIGS. 2 to 4, the polarization splitting layer 23 includes stacked one-dimensional grating layers which can include a structure finer than the wavelength used, namely, a sub-wavelength structure (SWS). In FIG. 1, the first optical member 22 has a light entrance surface 25, a light exit surface 26 that transmits a light beam reflected by the polarization splitting layer 23, and a surface (not shown in FIG. 1) in contact with the plane-parallel plate 31 (FIG. 6). The second optical member 24 has a light exit surface 27 that transmits the rays of the light beam from the light entrance surface 25 passing through the polarization splitting layer 23. That is, the polarizing beam splitter according to this exemplary embodiment functions to reflect and/or transmit incident light components according to the polarization directions thereof.

In FIG. 1, the plane-parallel plate 31 and the polarization splitting layer 23 are tilted a chosen angle (e.g., 45°) with respect to the light entrance surface 25 of the first optical member 22. In FIG. 2, an incident plane 28 in which rays 18 and 20, passing through the light entrance surface 25 substantially perpendicularly, are made incident on the polarization splitting layer 23 is substantially parallel to the grating direction, referred to as direction P (a direction substantially perpendicular to a grating period direction), of a first one-dimensional grating 101 of the polarization splitting layer 23. On the other hand, the grating direction of a second one-dimensional grating 102 is normal to the incident plane 28; let the direction be a direction V.

In FIG. 2, the grating direction of a third one-dimensional grating 103 is parallel to the incident plane 28; that is, the grating direction of the third one-dimensional grating 103 is the direction P.

The polarization splitting layer 23 reflects s-polarized light 21 which exits through the light exit surface 26 of the first optical member 22.

On the other hand, the polarization splitting layer 23 transmits p-polarized light 19 which exits through the light exit surface 27 of the second optical member 24.

Figure 5:
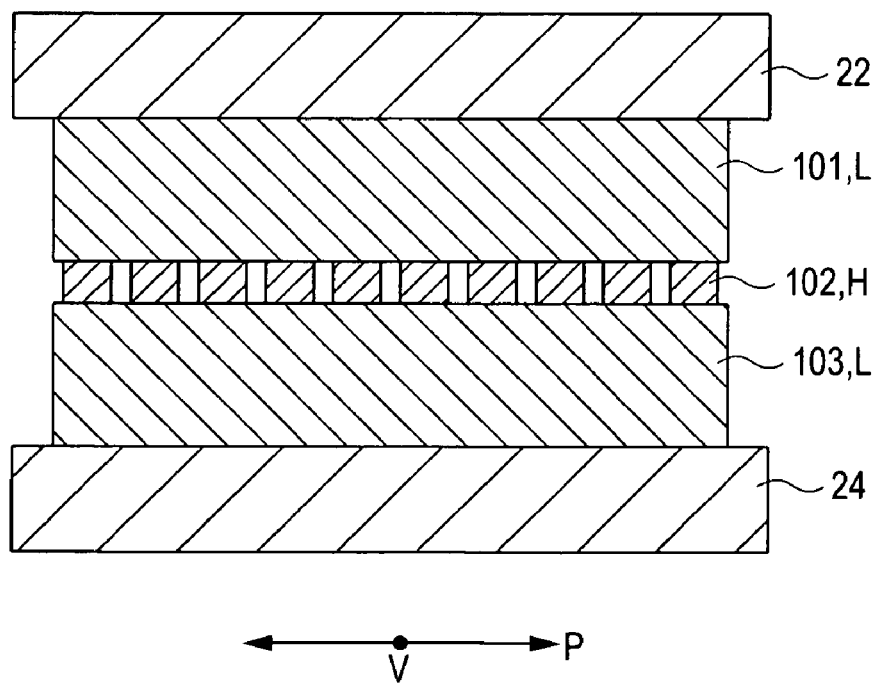
FIG. 5 illustrates a sectional view of the gratings in the polarizing beam splitter according to the first exemplary embodiment from the direction B in FIG. 2.

FIG. 3 illustrates a perspective view of the one-dimensional gratings 101, 102, and 103 of the polarization splitting layer 23. FIG. 4 illustrates a sectional view of the one-dimensional gratings 101, 102, and 103 looking from direction A in FIG. 2 with the addition of a portion of the first and second optical elements 22 and 24. FIG. 5 illustrates a sectional view of the one-dimensional gratings 101, 102, and 103 from the arrow direction B in FIG. 2.

The first one-dimensional grating 101 and the third one-dimensional grating 103 can be L layers which can include air and a dielectric material (e.g., $TiO_2$) that are alternately arranged. The second one-dimensional grating 102 can be an H layer which can include air and a dielectric material (e.g., $TiO_2$) that are alternately arranged. Such a relatively simple structure including three layers achieves polarization splitting.

Various dielectric materials can be used in the L and H layers (e.g., $TiO_2$, AlN, other dielectric material as known by one of ordinary skill in the relevant art and equivalents). The terms "H layer" and "L layer" represent layers having higher and lower effective refractive indices, respectively, for s-polarized light, which is reflected. Thus, the H layer has a higher effective refractive index for s-polarized light than the L layer. The second one-dimensional grating 102 can have various thicknesses (e.g., in one example the thickness is 66 nm), which is sufficient to achieve substantially total reflection of s-polarized light. A light beam generally undergoes total reflection with no light component transmitted when the light beam is made incident from a medium having a higher refractive index onto a medium having a lower refractive index at angles greater than a critical angle $\theta_C$.

In the total reflection, however, evanescent light penetrates into an extremely narrow region in the vicinity of the boundary surface. If the light reaches the adjacent medium, the medium transmits the light. This phenomenon is called attenuated total reflection (ATR).

This exemplary embodiment exploits the interference of light in ATR to achieve increased reflectance over wide ranges of angles and wavelengths.

The L layers, namely the first and third one-dimensional gratings 101 and 103, can have various thicknesses (e.g., a thickness of 351 nm) to utilize ATR effectively. As the thickness is decreased, a larger light component is transmitted by ATR at angles greater than the critical angle $\theta_C$. This results in insufficient reflection.

The thickness of the first and third one-dimensional gratings 101 and 103 can be increased in view of ATR; however, little effect appropriate to the increase in thickness is provided because the reflectance asymptotically approaches the total reflection. An increased thickness results in increased difficulty of manufacture because of the grating form of the polarization splitting layer 23 in this exemplary embodiment. Accordingly, the thickness of the first and third one-dimensional gratings 101 and 103 can be adjusted to ease manufacturing considerations and to provide an adequate level of ATR mitigation. In addition, the range of angles used includes angles less than the critical angle $\theta_C$ at which a light beam undergoes normal reflection. At the angles less than the critical angle $\theta_C$, a chosen level of interference can be achieved by employing the above adjusted thickness.

In the first exemplary embodiment, the first and second optical members 22 and 24 can be made from many optical materials (e.g., made of a glass) having a relatively low refractive index $n_C$ (e.g., about 1.603 for glass), as shown in Table 1. As described above, the dielectric material used for the H layer which can include the second one-dimensional grating 102 and the L layers which can include the first and third one-dimensional gratings 101 and 103 can vary depending upon the wavelength designed for (e.g. $TiO_2$, which has a refractive index of 2.282). Birefringence is facilitated by using a high-refractive-index material and by adjusting the filling factors f of the L layers and the H layer to vary (e.g., from 0.22 for the L layer and 0.85 for the H later).

Figure 11:
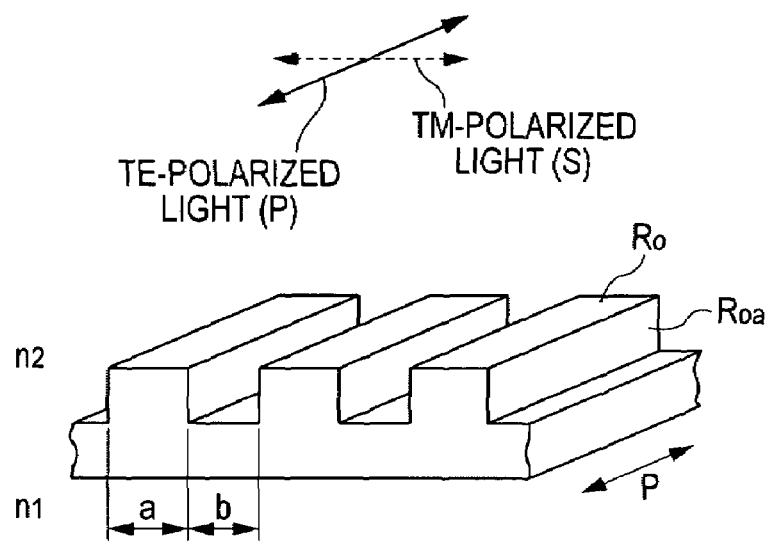
FIG. 11 is a diagram illustrating the effective refractive index of a model of a one-dimensional SWS grating.

In general, the effective refractive index of a one-dimensional grating having the SWS differs for each polarization direction. This difference originates in the grating structure. Referring to FIG. 11, for a one-dimensional grating layer $R_0$, light polarized in a direction substantially parallel to a grating $R_{0a}$ (polarized light oscillating in the grating direction) is TE-polarized light, and light polarized in a direction substantially perpendicular to the grating $R_{0a}$ (polarized light oscillating in the grating period direction) is TM-polarized light. The effective refractive indices $n_{TE}$ and $n_{TM}$ for the TE-polarized light and the TM-polarized light, respectively, are represented by the following equations (1) and (2):

$$TE\ n_{TE} = \sqrt{\frac{an_1^2 + bn_2^2}{a+b}} \quad (1)$$

$$TM\ n_{TM} = \sqrt{\frac{a+b}{a/n_1^2 + b/n_2^2}} \quad (2)$$

wherein $n_1$ is the refractive index of the medium on the grating layer $R_{0a}$ side; $n_2$ is the refractive index of the medium on the opposite side; and a and b indicate the widths of the media of the grating layer $R_0$.

Figure 12:
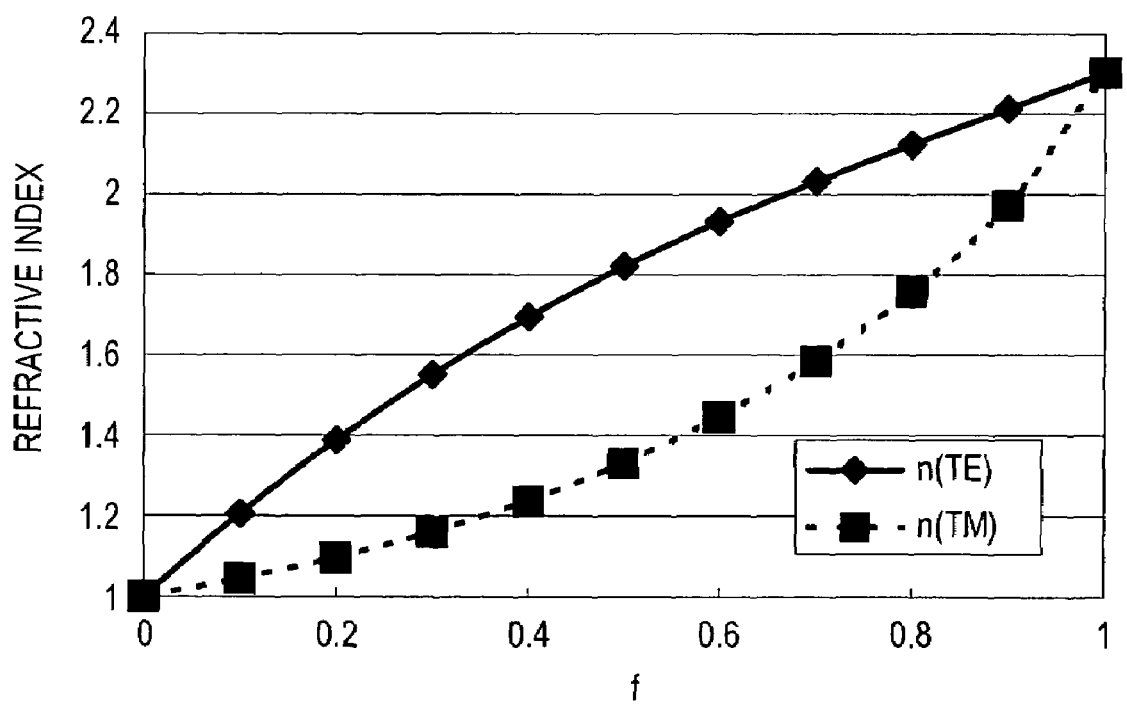
FIG. 12 illustrates a graph showing the structural birefringence of a one-dimensional SWS grating made of $TiO_2$.

In the polarization splitting layer 23 according to this exemplary embodiment, for the second one-dimensional grating 102, which is oriented in the direction V, p-polarized light is TM-polarized light and s-polarized light is TE-polarized light. For the first and third one-dimensional gratings 101 and 103, which is oriented in the direction P, p-polarized light is TE-polarized light and s-polarized light is TM-polarized light. FIG. 12 illustrates the effective refractive indices n(TE) and n(TM) for light components polarized by a one-dimensional grating made of two media, in this non-limiting example namely $TiO_2$ and air, with varying filling factors f (the proportion of $TiO_2$ to the pitch) in the equations (1) and (2).

FIG. 12 uses data from a simulation where for the p-polarized light, as shown in Table 2, the first one-dimensional grating 101, which has a filling factor f of 0.22, has an effective refractive index of 1.71 while the second one-dimensional grating 102, which has a filling factor f of 0.85, has an effective refractive index of 1.60. These refractive indices are close to the refractive index of the plane-parallel plate 31, namely 1.52, so that the first and second one-dimensional gratings 101 and 102 exhibit increased transmittance with no reflection. In general, the Brewster's angle $\theta_B$ between two media having refractive indices of $n_1$ and $n_2$ is given by the following equation (3):

$$\tan\theta_B = n_2/n_1 \quad (3)$$

Substantially all of the rays of p-polarized light incident at the angle $\theta_B$ are transmitted.

The polarizing beam splitter, in accordance with at least one exemplary embodiment, can satisfy equation (4), which represents the relationship between refractive index and angle, simultaneously for the interfaces between the plane-parallel plate 31, the H layer, and the L layers. Accordingly, the relationship between the refractive index $n_P$ of the material for the plane-parallel plate 31 and the effective refractive indices $n_H$ and $n_L$ of the H layer and the L layers, respectively, for p-polarized light can satisfy the following equation (4):

$$n_P = \sqrt{\frac{n_H^2 n_L^2}{\sin^2\theta_B(n_H^2 + n_L^2)}} \quad (4)$$

In this exemplary embodiment, the first optical member 22 is provided on the incident side of the plane-parallel plate 31. As described above, the plane-parallel plate 31 and the polarization splitting layer 23 are tilted a chosen angel (e.g., 45°) with respect to the light entrance surface 25 of the first optical member 22. Also, because of their geometric relationship, a light beam entering the light entrance surface 25 substantially perpendicular is made incident at the chosen angle (e.g., 45°) on the plane-parallel plate 31 and the polarization splitting layer 23. That is, the angle between the plane-parallel plate 31 and the polarization splitting layer 23 and the light entrance surface 25 of the first optical member 22 can be equal to the incident angle of the light beam entering the light entrance surface 25 substantially perpendicular with respect to the plane-parallel plate 31 and the polarization splitting layer 23. The light beam incident on the plane-parallel plate 31 and the polarization splitting layer 23 mainly includes rays entering the light entrance surface 25 substantially perpendicular. Accordingly, the requirements for transmission of p-polarized light can be satisfied if the incident angle of the rays entering the light entrance surface 25 substantially perpendicular, or the angle between the plane-parallel plate 31 and the polarization splitting layer 23 and the light entrance surface 25 of the first optical member 22, is close to Brewster's angle. Thus the polarizing beam splitter according to this embodiment can satisfy the following equation (5):

$$0.7 < \sqrt{\frac{n_H^2 n_L^2}{\sin^2\theta_1(n_H^2 + n_L^2)}} \bigg/ n_p < 1.3 \quad (5)$$

wherein $\theta_1$ is the angle between the light entrance surface 25 of the first optical member 22 and the polarization splitting layer 23.

Substituting $n_H=1.60$, $n_L=1.57$, and $n_P=1.52$ into the non-limiting example, and equation (4) yields a Brewster's angle $\theta_B$ of about 50.20. Thus, the requirements for transmission of the light beam mainly including the rays incident at 45° are substantially satisfied. For s-polarized light, as shown in Table 2, the first one-dimensional grating 101 has an effective refractive index of 1.24 while the second one-dimensional grating 102 has an effective refractive index of 2.05. Incidence angles greater than the critical angle $\theta_C$ are required for total reflection; where the critical angle $\theta_C$ is given by the following equation (6):

$$\sin\theta_C = n_2/n_1 \quad (6)$$

Substituting the effective refractive indices of the individual layers for s-polarized light shown in Table 2, namely $n_1=2.05$ and $n_2=1.24$, into equation (6) yields a critical angle $\theta_C$ of about 37°. ATR occurs at incident angles greater than the critical angle $\theta_C$. Increased reflectance is also achieved at smaller incident angles, which are greater than the critical angle $\theta_C$.

As described above, the first and second one-dimensional gratings 101 and 102 can have similar effective refractive indices for p-polarized light and can have a large difference in effective refractive index for s-polarized light to achieve both the transmission of p-polarized light and the reflection of s-polarized light.

In this exemplary embodiment, the above relationship between the effective refractive indices of the first and second one-dimensional gratings 101 and 102 can be efficiently achieved by satisfying equation (1).

In this exemplary embodiment, additionally, at least one of the first and second optical members 22 and 24 is made of a material having a photoelastic constant below $0.1 \times 10^{-8}$ cm²/N in absolute value.

Furthermore, the polarizing beam splitter according to this embodiment can satisfy the following equation (7):

$$0 < \frac{|n_C - n_P|D_C}{L} < 15 \quad (7)$$

wherein $n_C$ is the refractive index of the material for the first optical member 22; $\theta_D$ is the thickness of the plane-parallel plate 31; and L is the amount of deviation in traveling direction between incident light and outgoing light due to the plane-parallel plate 31 when a light beam is made incident from the light entrance surface 25 of the first optical member 22 onto the plane-parallel plate 31 at a chosen incident angle (e.g., 45°).

Equation (7) defines an amount of transverse deviation, L, of a light beam in the optical system used so that astigmatism on the plane-parallel plate 31 can be inhibited. A large astigmatism can occur if the value obtained exceeds the upper limit of equation (7) as a result of an increase in the difference in refractive index or the thickness of the plane-parallel plate 31.

The thickness $D_C$ of the plane-parallel plate 31 can vary (for example, about 0.1 mm<$D_C$<1.5 mm), and the acceptable amount L can vary (e.g., about 0.005 mm<L<0.1 mm). FIG. 13 illustrates the results of a performance simulation by rigorous coupled-wave analysis (RCWA) with the above values. According to the results, the transmittance for p-polarized light decreased at the higher incident angle, though the decrease is nearly insignificant in consideration of the weight of angular characteristics for practical use. For s-polarized light, though performance deterioration occurred at the lower incident angle on the lower wavelength side, almost no rays passed at a considerably wide range of incident angles, namely 35° to 55°, and thus near total reflection was achieved.

Referring to FIG. 6, in the first exemplary embodiment, the plane-parallel plate 31 and the polarization splitting layer 23 disposed thereon are disposed between the first and second optical members 22 and 24 with a spacer 32 provided therebetween. The polarization splitting layer 23 can be vulnerable to external forces because it has a structure finer than the wavelength used. The spacer 32 is provided between the two optical members 22 and 24 so that no stress is applied to the plane-parallel plate 31 and the polarization splitting layer 23 when they are disposed between the optical members 22 and 24. In addition, the plane-parallel plate 31 has such a thickness and refractive index that the polarizing beam splitter can satisfy equations (5) and (7), achieving improved performance.

In this exemplary embodiment, additionally, the spacer 32 defines the distance between the optical members 22 and 24, and the polarization splitting layer 23 is sealed therebetween with a sealant.

Figure 7:
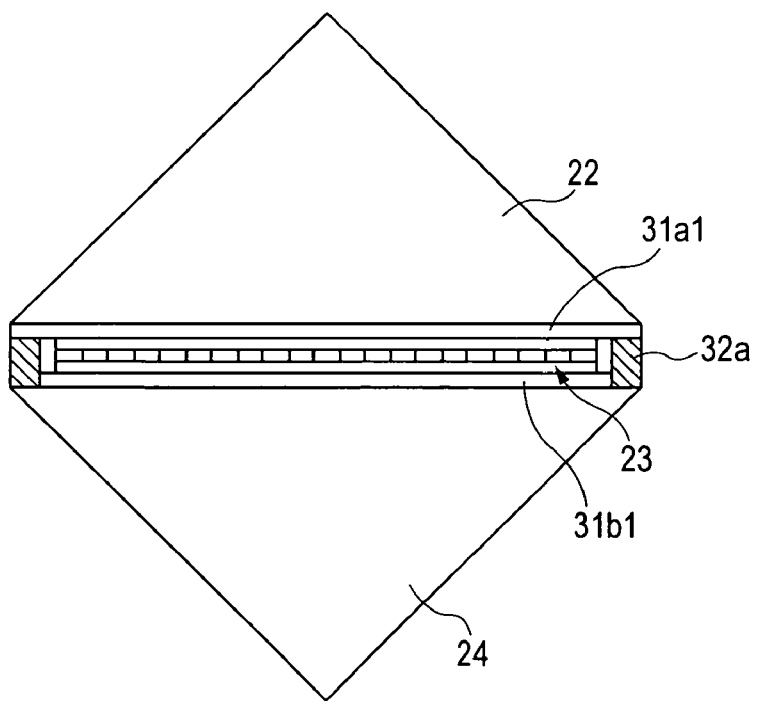
FIG. 7 illustrates a schematic diagram of a polarizing beam splitter according to a second exemplary embodiment.

FIG. 7 illustrates a sectional view of the main part of a polarizing beam splitter according to a second exemplary embodiment. In this exemplary embodiment, the polarization splitting layer 23 is disposed between plane-parallel plates 31a1 and 31b1, which are disposed between the pair of optical members 22 and 24. A spacer 32a is provided between the plane-parallel plate 31a1 and the optical member 24 opposite the plane-parallel plate 31b1 across the polarization splitting layer 23.

Figure 8:
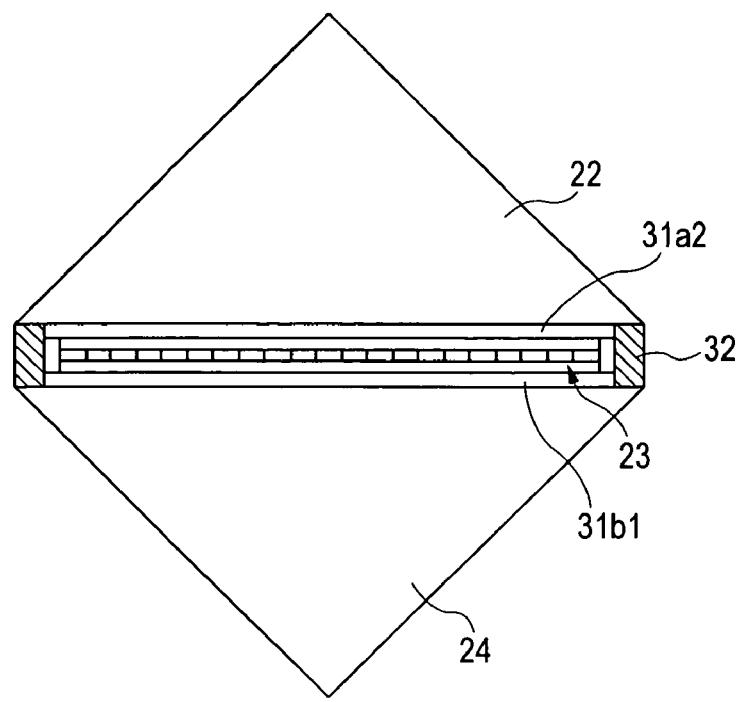
FIG. 8 illustrates a schematic diagram of a polarizing beam splitter according to a third exemplary embodiment.

FIG. 8 illustrates a sectional view of the main part of a polarizing beam splitter according to a third exemplary embodiment. In this exemplary embodiment, the polarization splitting layer 23 is disposed between a plane-parallel plate 31a2 and the plane-parallel plate 31b1, which are disposed between the pair of optical members 22 and 24. The spacer 32 is provided between the optical members 22 and 24.

Figure 9:
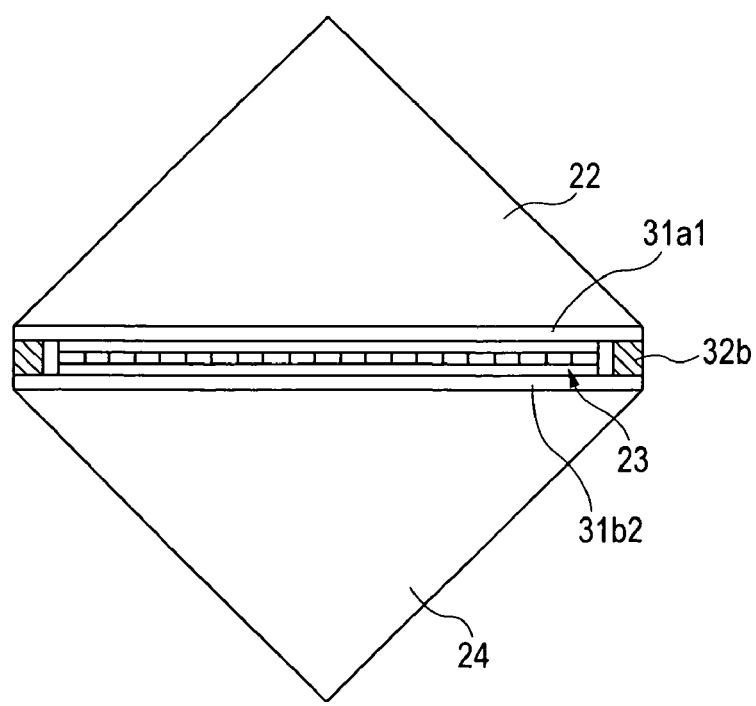
FIG. 9 illustrates a schematic diagram of a polarizing beam splitter according to a fourth exemplary embodiment.

FIG. 9 illustrates a sectional view of the main part of a polarizing beam splitter according to a fourth exemplary embodiment. In this exemplary embodiment, the polarization splitting layer 23 is disposed between the plane-parallel plates 31a1 and 31b2, which are disposed between the pair of optical members 22 and 24. A spacer 32b is provided beside the polarization splitting layer 23 between the plane-parallel plate 31a1 and a plane-parallel plate 31b2.

The polarizing beam splitters according to the second to fourth exemplary embodiments can be produced as one unit by disposing the polarization splitting layer 23, which can require fine processing, between glass plates and sealing them with a sealant. This enables separate production of prisms, which can require increased performance related to shape (for example, angle, dimensions, and plane accuracy), to improve productivity.

Figure 10:
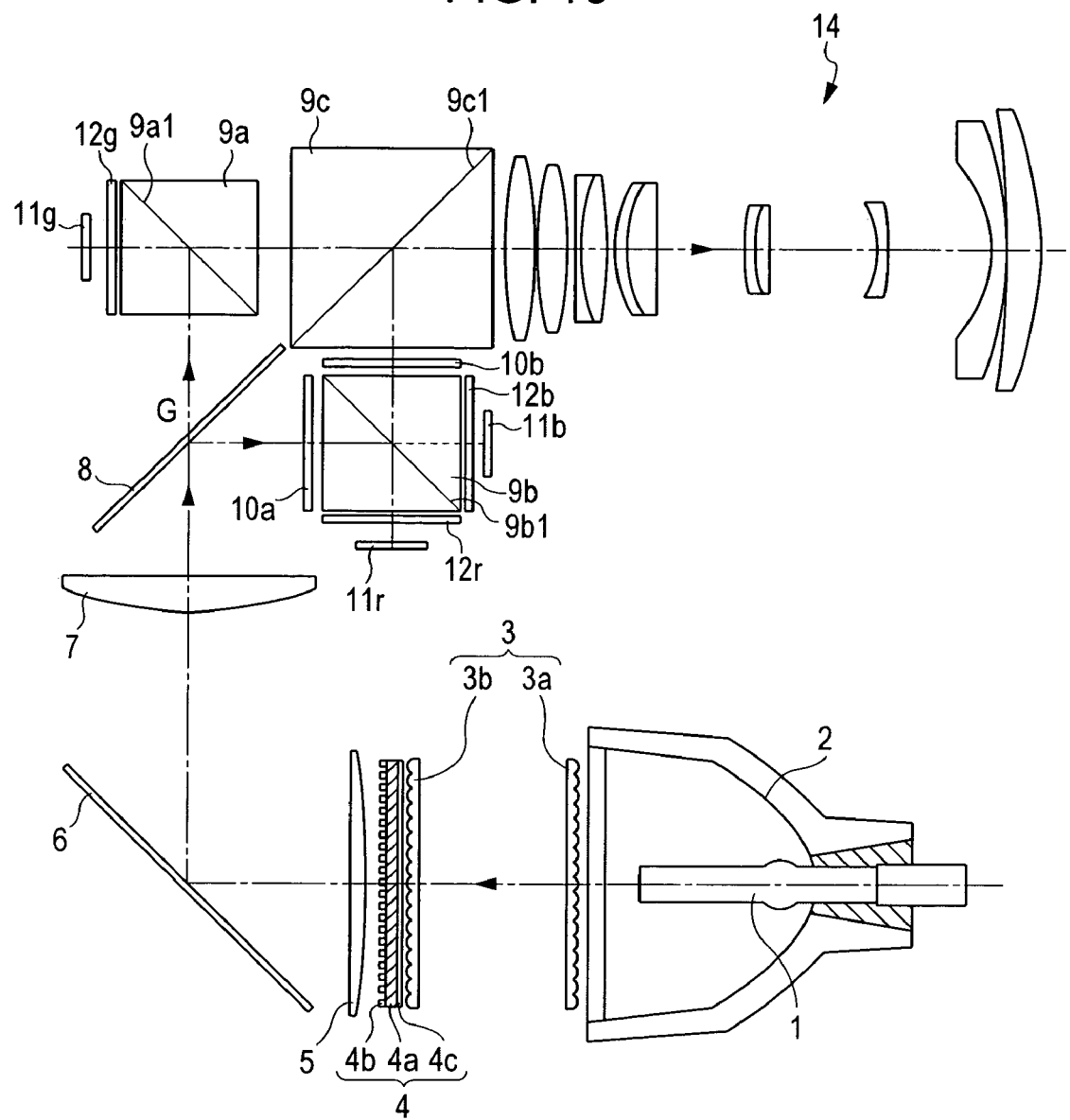
FIG. 10 illustrates a schematic diagram of a liquid crystal projector including polarizing beam splitters according to an embodiment.

FIG. 10 illustrates a schematic diagram of the main part of a projection display including polarizing beam splitters according to an exemplary embodiment. In FIG. 10, this projection display includes a light source 1 (e.g., a high-pressure mercury lamp); a reflector 2 for guiding light from the light source 1 in a predetermined direction; an integrator 3 including fly's-eye lenses 3a and 3b to form an illumination region with a uniform illumination intensity; a polarization converter 4 for converting unpolarized light into predetermined polarized light; a condenser lens 5 for condensing the illumination light; a mirror 6; a field lens 7 for converting the illumination light into telecentric light; a dichroic mirror 8 for transmitting light G in the green wavelength region; polarizing beam splitters 9a, 9b, and 9c including polarization splitting layers 9a1, 9b1, and 9c1, respectively, for reflecting s-polarized light and transmitting p-polarized light according to the first, second, third, or fourth exemplary embodiment; color-selective phase plates 10a and 10b for converting (rotating) the polarization direction of light in a predetermined wavelength region by 90°; reflective liquid crystal display elements 11r, 11g, and 11b for reflecting and modulating incident illumination light according to image signals to form image light; ¼ phase plates 12r, 12g, and 12b; and a projection lens system 14. The above structure, by including the polarizing beam splitters according to the first, second, third, or fourth exemplary embodiment, is directed to a reflective liquid crystal projector that excels in incident angle characteristics and wavelength characteristics to achieve increased contrast as the overall optical system.

TABLE 1

| Layer number | Medium | Thickness (microns) | f | Pitch = 0.120 microns Grating direction | |
|---|---|---|---|---|---|
| 101 | TiO$_2$ | 0.351 | 0.22 | P | L |
| 102 | TiO$_2$ | 0.066 | 0.85 | V | H |
| 103 | TiO$_2$ | 0.351 | 0.22 | P | L |

Effective refractive index $n_P$ of material for plane-parallel plate=1.52

Effective refractive index $n_C$ of material for optical members=1.603

TABLE 2

| | Effective refractive index | |
|---|---|---|
| Layer number | p-polarized light | s-polarized light |
| 101 | 1.71 | 1.24 |
| 102 | 1.60 | 2.05 |
| 103 | 1.71 | 1.24 |

TABLE 3

| Embodiment | Equation (5) | Equation (7) |
|---|---|---|
| First to fourth exemplary embodiments | 1.087 | 4.15 |

$\theta_1 45°$; $\lambda s=400$ nm; $D_C=0.5$ mm; $L=0.010$ mm

According to the above exemplary embodiments, as described above, a polarization splitting layer is disposed between two optical members. This structure is easy to produce, causes little astigmatism, and can achieve increased polarization splitting performance over wide ranges of wavelengths and incident angles.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-320989 filed Nov. 4, 2004, which is hereby incorporated by reference herein in its entirety.

What is claimed is:
1. A polarizing beam splitter comprising:
a plane-parallel plate;
a polarization splitting layer formed on the plane-parallel plate to split incident light into reflected light and transmitted light according to the polarization directions thereof, the polarization splitting layer including stacked one-dimensional grating layers, the stacked grating layers being an alternation of at least one H layer having an effective refractive index $n_H$ for p-polarized light and at least one L layer having an effective refractive index $n_L$ for p-polarized light; and
a first optical member having a light entrance surface, a light exit surface that transmits the light reflected by the polarization splitting layer, and a surface in contact with the plane-parallel plate,
the polarizing beam splitter satisfying the following equation:

$$0.7 < \sqrt{\frac{n_H^2 n_L^2}{\sin^2\theta_1(n_H^2 + n_L^2)}} \Big/ n_p < 1.3$$

wherein $n_p$ is the refractive index of the material for the plane-parallel plate; and $\theta_1$ is the angle between the light entrance surface of the first optical member and the polarization splitting layer, wherein said polarization splitting layer reflects s-polarized light that is made incident onto the polarization splitting layer at an angle $\theta_1$ by total reflection and transmits p-polarized light that is made incident onto the polarization splitting layer at an angle $\theta_1$, and wherein angle $\theta_1$ is equal to or larger than a critical angle for the s-polarized light and angle $\theta_1$ is smaller than the critical angle for the p-polarized light.

2. The polarizing beam splitter according to claim 1, further satisfying the following equation:

$$0 < \frac{|n_C - n_P|D_C}{L} < 15$$

wherein $n_C$ is the refractive index of the material for the first optical member; $D_C$ is the thickness of the plane-parallel plate; and L is the amount of deviation between the incident and emergent positions of light incident on the plane-parallel plate at an incident angle of about 45°.

3. The polarizing beam splitter according to claim 1, further comprising a second optical member having a light-entrance surface on which light passing through the polarization splitting layer is made incident and a light-exit surface that transmits the light from the light entrance surface.

4. The polarizing beam splitter according to claim 3, further comprising a spacer provided between the first and second optical members to define the distance between opposite surfaces of the optical members.

5. The polarizing beam splitter according to claim 4, wherein the polarization splitting layer is sealed between the first and second optical members with the spacer and a sealant.

6. The polarizing beam splitter according to claim 3, wherein at least one of the first and second optical members has a photoelastic constant below $0.1 \times 10^{-8}$ cm$^2$/N in absolute value.

7. A display comprising:
an illumination optical system including:
a polarizing beam splitter comprising:
a plane-parallel plate;
a polarization splitting layer formed on the plane-parallel plate to split incident light into reflected light and transmitted light according to the polarization directions thereof, the polarization splitting layer including stacked one-dimensional grating layers, the stacked grating layers being an alternation of at least one H layer having an effective refractive index $n_H$ for p-polarized light and at least one L layer having an effective refractive index $n_L$ for p-polarized light; and
a first optical member having a light entrance surface, a light exit surface that transmits the light reflected by the polarization splitting layer, and a surface in contact with the plane-parallel plate, the polarizing beam splitter satisfying the following equation:

$$0.7 < \sqrt{\frac{n_H^2 n_L^2}{\sin^2\theta_1(n_H^2 + n_L^2)}} \bigg/ n_p < 1.3$$

wherein $n_p$ is the refractive index of the material for the plane-parallel plate; and $\theta_1$ is the angle between the light entrance surface of the first optical member and the polarization splitting layer, wherein said polarization splitting layer reflects s-polarized light that is made incident onto the polarization splitting layer at an angle $\theta_1$ by total reflection and transmits p-polarized light that is made incident onto the polarization splitting layer at an angle $\theta_1$, and wherein angle $\theta_1$ is equal to or larger than a critical angle for the s-polarized light and angle $\theta_1$ is smaller than the critical angle for the p-polarized light;
a liquid crystal panel illuminated by the illumination optical system; and
a projection optical system for projecting light modulated by the liquid crystal panel onto a predetermined surface.

8. A polarization layer comprising:
a plane-parallel plate; and
a plurality of stacked one-dimensional grating layers formed on the plane-parallel plate comprising:
a plurality of H-type one-dimensional grating layers; and
a plurality of L-type one-dimensional grating layers, wherein the H-type layers have an effective refractive index $n_H$ for p-polarized light and the L-type layers have an effective refractive index $n_L$ for p-polarized light, and where the H-type and L-type layers and the plane parallel plate satisfy:

$$0.7 < \sqrt{\frac{n_H^2 n_L^2}{\sin^2\theta_1(n_H^2 + n_L^2)}} \bigg/ n_p < 1.3$$

where $n_p$ is the refractive index of the material for the plane-parallel plate and $\theta_1$ is the angle between an incident light on the plane parallel-plate and the normal of the plane-parallel plate, wherein the polarization layer reflects an s-polarized light that is made incident onto the polarization splitting layer at an angle $\theta_1$ by total reflection and transmits p-polarized light that is made incident onto the polarization splitting layer at an angle $\theta_1$, and wherein angle $\theta_1$ is equal to or larger than a critical angle for the s-polarized light and angle $\theta_1$ is smaller than the critical angle for the p-polarized light.

9. A polarizing beam splitter comprising in the following order from a light entrance side:
a first optical member;
a plate arranged adjacent to the first optical member; and
a polarization splitting layer arranged adjacent to the plate, wherein the first optical member includes a surface in contact with the plate, a light entrance surface and a light exit surface,
the polarization splitting layer has a plurality of stacked one-dimensional grating layers, the plurality of grating layers being an alternation of an H layer having an effective refractive index $n_H$ for p-polarized light and an L layer having an effective refractive index $n_L$ for p-polarized light, wherein each of the one-dimensional grating layers is a sub-wavelength structure with cycle length smaller than the wavelength used and cycle direction is parallel to the light entrance surface of the plate, wherein the light entrance surface and a surface in contact with the plate are not parallel to each other, wherein the light exit surface and the surface in contact with the plate are not parallel to each other, and
the polarization splitting layer reflects s-polarized light by total reflection and guides s-polarized light to the light exit surface and transmits p-polarized light out of lights that enter from the light entrance surface.

10. An image display apparatus comprising:

a liquid crystal panel;

a illumination optical system including a polarizing beam splitter, for guiding light from a light source to the liquid crystal panel via the polarizing beam splitter; and a projection optical system for projecting light modulated by the liquid crystal panel onto a projected surface, wherein the polarizing beam splitter comprising in the following order from a light entrance side of light from the light source:

a first optical member;

a plate arranged adjacent to the first optical member; and a polarization splitting layer arranged adjacent to the plate, wherein the first optical member includes a surface in contact with the plate, a light entrance surface and a light exit surface, the polarization splitting layer has a plurality of stacked one-dimensional grating layers, the plurality of grating layers being an alternation of an H layer having an effective refractive index $n_H$ for p-polarized light and an L layer having an effective refractive index $n_L$ for p-polarized light, wherein each of the one-dimensional grating layers is a sub-wavelength structure with cycle length smaller than the wavelength used and cycle direction is parallel to the light entrance surface of the plate, wherein the light entrance surface and a surface in contact with the plate are not parallel to each other wherein the light exit surface and the surface in contact with the plate are not parallel to each other, and the polarization splitting layer reflects s-polarized light by total reflection and guides s-polarized light to the light exit surface and transmits p-polarized light out of lights that enter from the light entrance surface.

11. A polarizing beam splitter according to claim 1, wherein the polarization spitting layer is configured such that a refractive index for s-polarized light is different from a refractive index for p-polarized light.

12. A polarizing beam splitter according to claim 9, wherein the polarization spitting layer is configured such that a refractive index for s-polarized light is different from a refractive index for p-polarized light.

13. A image display apparatus according to claim 10, wherein the polarization spitting layer is configured such that a refractive index for s-polarized light is different from a refractive index for p-polarized light.

* * * * *